(12) United States Patent
Weiss

(10) Patent No.: US 6,492,975 B1
(45) Date of Patent: Dec. 10, 2002

(54) COMPUTER MOUSE

(76) Inventor: Josef Weiss, 23 Murphy Ct. #1, Newton, MA (US) 02458

( * ) Notice: Subject to any disclaimer, the term of this patent is extended or adjusted under 35 U.S.C. 154(b) by 197 days.

(21) Appl. No.: 09/677,911

(22) Filed: Oct. 3, 2000

(51) Int. Cl.[7] .................................................. G09G 5/08
(52) U.S. Cl. .......................................... 345/163; 463/37
(58) Field of Search ................................ 345/163, 157; 463/37; D14/402

(56) References Cited

U.S. PATENT DOCUMENTS

| | | | |
|---|---|---|---|
| 5,576,733 A | * | 11/1996 | Lo |
| 5,581,277 A | * | 12/1996 | Tajiri |
| 5,892,499 A | * | 4/1999 | Vulk, Jr. |
| 6,064,371 A | * | 5/2000 | Bunke et al. |

* cited by examiner

Primary Examiner—Richard Hjerpe
Assistant Examiner—Hau Nguyen

(74) Attorney, Agent, or Firm—Lambert & Associates; Gary E. Lambert; Edward Timmer

(57) ABSTRACT

The present invention is an improved computer mouse for inputting cursor commands into a computer of the type having a flat base with a tracking means for use on a flat work surface and switches operable with the fingers of the user. The improved computer mouse comprises a housing having a flat base, a vertical rear wall at a right angle to said flat base, a top and front surface disposed between the front edge of the base and the upper edge of the rear wall. The base having a front to rear dimension less than the height of the rear wall, so that the mouse is readily tiltable rearwardly. Also provided is a means for disabling the mouse when so tilted. The top and front surface being so disposed and elevated such that the user's hand is positioned above the work surface: (i) so that his/her fingers drape over the mouse touching the work surface or slightly thereabove, and (ii) so that the user's wrist is straight or substantially straight whereby repetitive or prolonged use of the mouse will lessen the likelihood of developing carpal tunnel syndrome, tendonitis or a related condition.

14 Claims, 4 Drawing Sheets

COMPUTER MOUSE

FIELD OF THE INVENTION

The present invention relates generally to a computer mouse, and in particular to a computer mouse which eliminates user susceptibility to injuries such as carpal tunnel syndrome, tendonitis, and others.

BACKGROUND

Computers are usually equipped with a mouse to control the movement of the cursor. In the past, the computer mouse was designed mainly with the functional aspects of the mouse in mind and little effort was placed with regard to the user's body. As many computer users have suffered injuries such as carpal tunnel syndrome, tendonitis and others caused by the prolonged use of a computer mouse, manufacturers now attempt to design computer equipment including the computer mouse with the safety of the user in mind. However, to this day, most computer mouse developed heretofore do not prevent injuries to a user's wrist such as those mentioned above.

Many mouse designed for use with a computer are sized such that a user's wrist rests on a work surface rear of the mouse and the user's hand extends over the mouse. This position places the wrist in a compressed and vulnerable position, susceptible to wrist injuries such as those identified above. Prolonged compression of the wrist can result in other problems as well which may cause other injuries, such as: pressure on the wrist, tension in the fingers, the elbow and shoulder can become tense and locked which can cause further tension in the neck and head, the torso can fall forward creating additional pressure in the user's arm.

Numerous attempts have been made to rectify these problems including various mouse designs and other apparatus designed to support the wrist and arm of the computer mouse user. Many mouse designs attempting to eliminate wrist injuries are based on ergonomics and the comfort of the user. Even the ergonomic computer mouse designs that purport stress-free wrists, relieve stress mostly only in the wrist and thumb areas of the body. These designs still allow the arm to drop onto the mouse and do not teach the user to maintain a natural use of the arm. These ergonomically designed computer mouse may have some success in preventing wrist injuries, however user's may still be susceptible to injuries in other parts of the body such as the neck and back or even the thighs, knees, ankles, and toes.

The computer mouse of the present invention was designed in view of the Alexander Technique, developed by the late Frederick Alexander, which teaches a method of improving one's posture by developing an awareness of it. Alexander has shown that the body is a unique system and that improved posture can prevent misuse and deterioration of the human body due to extended strains. The present invention computer mouse teaches the user to extend both the wrist and fingers while using the mouse by ceasing to work if the user's wrist is in a compressed or bent configuration. The present invention mouse successfully eliminates user susceptibility to injuries such as carpal tunnel syndrome, tendonitis and others commonly caused by extended use of a standard computer mouse.

Computer use is still rapidly growing throughout the world and with the onslaught of Internet based information and menu driven web-pages, the computer mouse is a tool used more than ever before by computer users.

Accordingly, there is a need for a computer mouse that is safe for a computer user to operate without the risk of painful and debilitating injuries. The present invention computer mouse prevents user susceptibility to injuries, is simple in design, inexpensive to manufacture and can be used with any cursor tracking method.

SUMMARY OF THE INVENTION

The present invention provides an improved computer mouse which reduces user susceptibility to weakness and other hand, wrist and other bodily injuries such as carpal tunnel syndrome, tendonitis and other injuries caused by prolonged or repetitive use of a computer mouse. This device teaches a user to maintain his/her wrist in an extended position by ceasing to function if the user's wrist collapses into a compressed or bent position in which it becomes susceptible to the wrist and hand injuries identified above. Thus by not functioning if the user's wrist is in a compressed or bent position, the present invention computer mouse eliminates user susceptibility to the types of injuries identified above from prolonged or repetitive use of a computer mouse.

The present invention is an improved computer mouse for inputting cursor commands into a computer of the type having a flat base with a tracking means for use on a flat work surface and switches operable with the fingers of the user. The improved computer mouse comprises a housing having a flat base, a vertical rear wall at a right angle to said flat base, a top and front surface disposed between the front edge of the base and the upper edge of the rear wall. The base having a front to rear dimension less than the height of the rear wall, so that the mouse is readily tiltable rearwardly. Also provided is a means for disabling the mouse when so tilted.

The computer mouse of the present invention further comprises a top and front surface being so disposed and elevated such that the user's hand is positioned above the work surface: (i) so that his/her fingers drape over the mouse touching the work surface or slightly thereabove, and (ii) so that the user's wrist is straight or substantially straight whereby repetitive or prolonged use of the mouse will lessen the likelihood of developing carpal tunnel syndrome, tendonitis or a related condition. The disabling means teaches the user to maintain his/her wrist in this extended position while operating the improved computer mouse of the present invention.

In one embodiment, the improved computer mouse comprises a top and front surface which is convex, alternatively, in another embodiment of the present invention, the top and front surface is angular. In either configuration the top and front surface protrudes outward such that the user's fingers must be extended to operate the plurality of switches disposed on the lower portion of the top and front surface of the mouse.

The protruding top and front surface of the claimed computer mouse is designed specifically to accommodate only a limited portion of the user's hand. In the preferred embodiment of the present invention, the top and front surface is dimensioned to accept only two of the metacarpalphalangeal joints and two extended fingers of the user. In another embodiment, the top surface is slightly wider, designed to accept three extended fingers and three metacarpalphalangeal joints of the user's hand. In either design, the limited size of the protruding top and front surface of the computer mouse prevents the user from resting a major portion of his/her hand on the mouse which teaches the user to support the weight of his/her hand and wrist with his/her arm.

The substantially vertical rear wall of the present invention computer mouse has an overall height dimensioned such that when the mouse is in use, and the user is gripping the mouse, the wrist of the user is in an extended position spaced apart from the work surface and supported entirely by the arm of the user. In this position, the user's wrist is positioned above the upper edge of the rear wall of the mouse. Collapse of the user's wrist such that any portion of the user's wrist falls below the upper edge of the rear wall while the user is gripping the mouse causes the computer mouse to tilt rearwardly such that the base of the mouse is rotated away from the work surface about an axis formed by the intersection of the bottom edge of the rear wall and the rear edge of the base causing the mouse to cease to function.

In combination, the limited size of the protruding top and front surface, the overall height of the substantially vertical rear wall of the housing and the position of the switches along the lower edge of the protruding top and front surface of the computer mouse, teach the user, while using the mouse, to support his/her wrist and hand with the user's own arm such that the wrist is spaced apart from the work surface and in an extended position.

The fingers resting on the protruding top surface of the mouse must be extended to operate the switches positioned along the lower edge of the protruding top surface of the computer mouse. Also the present invention computer mouse ceases to function if the flat base of the mouse is lifted off of the work surface. The susceptibility of the user to hand and wrist injuries caused by operating a computer mouse with a bent or compressed wrist is thus eliminated in the computer mouse of the present invention.

The switches positioned along the lower edge of the protruding top and front surface of the present invention control the computer in a fashion typical to any computer mouse. The switches can be a plurality of push button, roller, touch key, or any suitable switch. Typically a computer mouse has at least left and right click switches, sometimes either a central roller or third switch is provided. The computer mouse of the present invention can employ any type and configuration of available switches. The mouse of the present invention has a symmetrical design such that it can be used in either the user's left or right hand and therefore the switches along the lower edge of the protruding top surface can function as either left or right switches.

The preferred embodiment of the computer mouse of the present invention comprises a top and front surface having a minimum height of about two inches so that the user's wrist is spaced apart from the work surface and wherein the user must support his wrist with his arm, rather than the computer mouse or the work surface. Therefore, the minimum rear wall height of the housing is also about two inches. This arrangement, although seemingly cumbersome, maintains the wrist in a safe position free to move about and also eliminates user susceptibility to the injuries described above. In embodiments designed for children or persons with small hands the present invention computer mouse has a rear wall of the mouse having an overall dimension less than two inches and the front to rear dimension of the base correspondingly less than the height of the rear wall to maintain the rearward tiltability of the mouse.

The improved computer mouse of the present invention further comprises a disabling means which disables the functionality of the mouse if the mouse is tilted rearwardly such that the flat base of the mouse is lifted off the work surface. This rearwardly tilting of the mouse occurs when the wrist of the user collapses or bends into a compressed position wherein it is susceptible to wrist injuries. In the preferred embodiment of the present invention computer mouse, the disabling means is a springed switch, however other means would function equally as well such as a light sensitive switch, tilt switch, or the equivalents thereof. In another embodiment of the improved computer mouse of the present invention, the disabling means is a sensor. One embodiment incorporates the use of a spring switch operative on a track ball, such that when the track ball is disengaged from the work surface, the switch activates to cease all functions of the computer mouse.

The computer mouse of the present invention further comprises a signal device to warn the user that the mouse is disabled. In the preferred embodiment of the present invention the signal device comprises a signal generator which provides optional audible and optical signals to alert the user the mouse is tilted and therefore disabled. The inventor has suggested the audible alert could be a "peep" or a sound similar to the "meow" of a cat. The optical signal is a plurality of lights positioned to alert the user of the disablement. In any case, the present invention, improved computer mouse comprises a method of detecting when the forward edge of the flat base of the computer mouse is lifted from the work surface, a disabling means to disable the functionality of the mouse when tilted, and also a warning device to inform the user of the disabled status of the computer mouse.

The preferred embodiment of the present invention computer mouse further comprises a plurality of feet on the lower surface of the flat base to facilitate the tracking means.

The improved computer mouse of the present invention can be used with either a standard wire connection to the computer or as a wireless mouse. In the wired configuration the applicant contemplates the wire entering the rear of the mouse above the work surface such that it would not interfere with the rearward tiltability of the mouse in the event that the user's wrist collapses. In other embodiments the wired configured computer mouse of the present invention, the wire is attached to the mouse on a sidewall of the housing again to prevent the wire from inhibiting the tiltabiltiy of the mouse. The applicant also contemplates in the wired mouse configuration one or more female couplers on the rear wall or sidewalls of the mouse to connect a removable control wire.

The flat base further comprises a tracking means for control of the computer. The computer mouse of the present invention is functional only when the flat base is parallel to a work surface. The tracking means could be a track ball assembly as used on most conventional computer mouse, a motion sensor or any motion tracking device now known in the art, or which may become available in the future. The present invention computer mouse can employ any electronic communication and motion sensing technologies without affecting the novelty and usefulness of the improvements of the applicant's present invention.

DETAILED DESCRIPTION OF THE PREFERRED EMBODIMENT

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that the drawings are not necessarily to scale, and relative component sizes may be exaggerated to facilitate an understanding of the invention.

The present invention relates to a computer mouse designed to eliminate user susceptibility to bodily injuries such as carpal tunnel syndrome, tendonitis and others by forcing the user to maintain his/her wrist in an extended position while operating the computer mouse of the present invention. This device can be used in a wide variety of embodiments described above and as claimed in the following claims.

Figure 1:
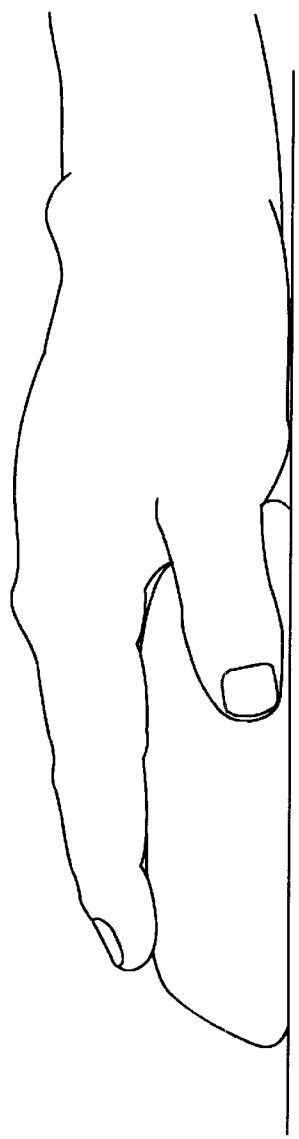
FIG. 1 is a side view of a typical prior art computer mouse and user's hand position during use of the mouse.
Figure 2:
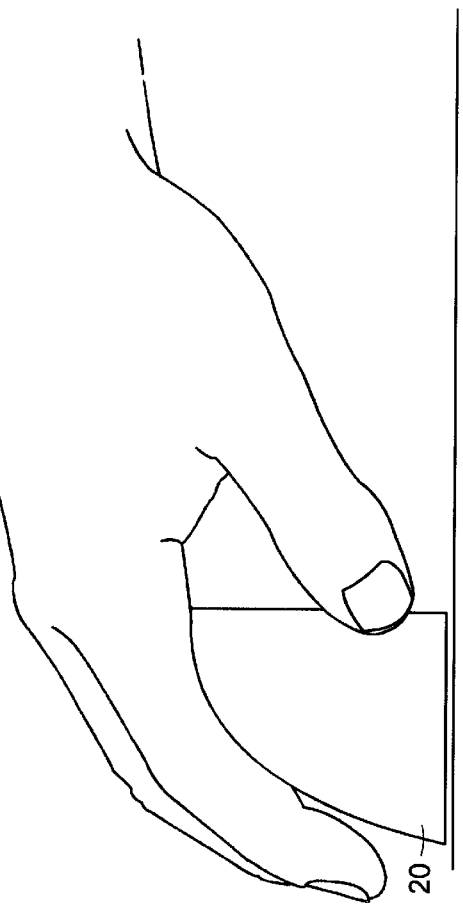
FIG. 2 is a side view of an embodiment of the computer mouse of the present invention with a user's hand shown positioned during use of the mouse.

Referring to the drawings, FIGS. 1 and 2 show a comparison of the positioning of a user's hand while using a typical conventional mouse in FIG. 1 and the improved computer mouse of the present invention in FIG. 2. In FIG. 1 the user's wrist is in a compressed and bent position in which it is susceptible to the wrist injuries mentioned above; FIG. 2 clearly shows the advantage of the novel design of the present invention computer mouse wherein the user's wrist is in an extended position such that the mouse can be safely used repetitively or for a prolonged time without risk of the injuries attributed to the use of former designs of computer mouse.

Figure 3:
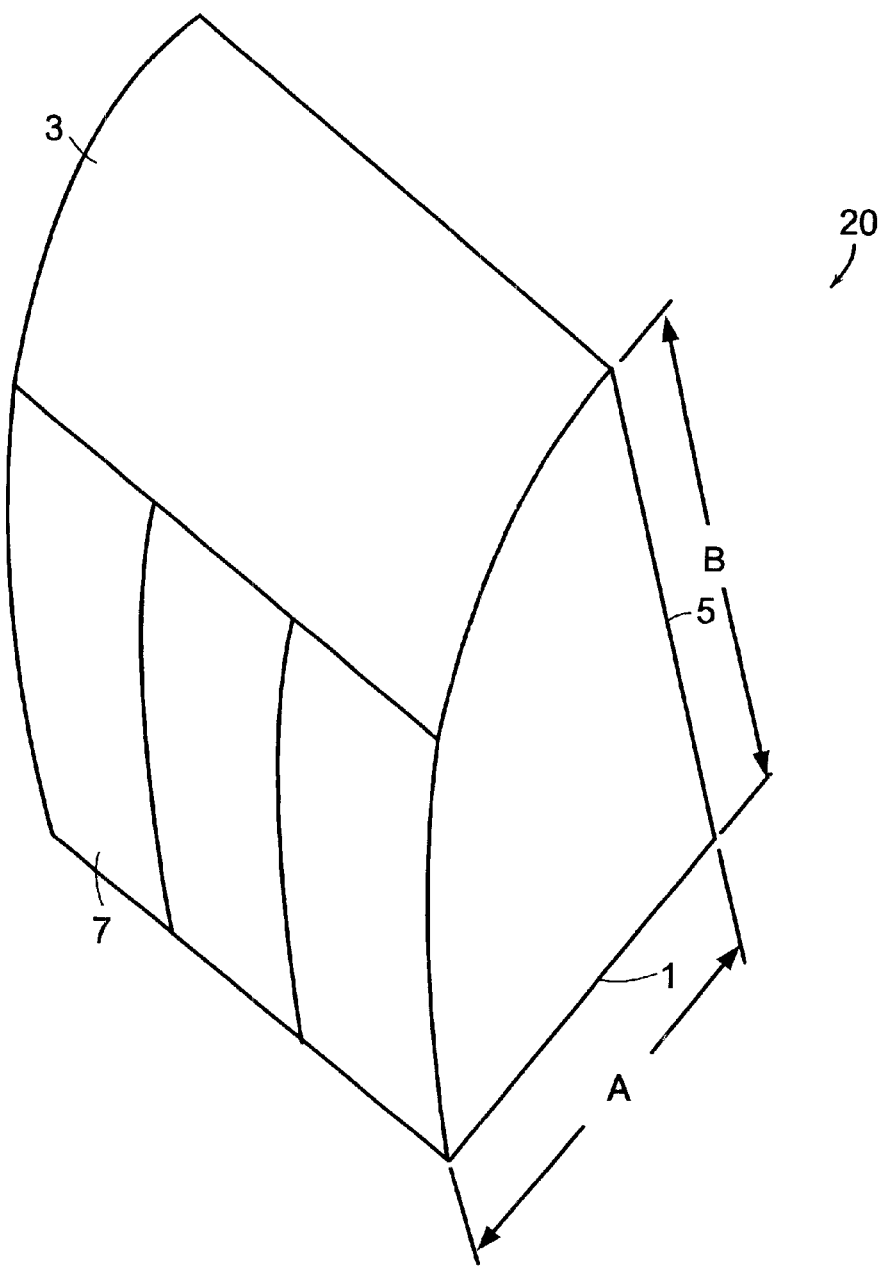
FIG. 3 is a perspective view of the preferred embodiment of the computer mouse of the present invention.

Referring again to the drawings, wherein like numerals represent like parts throughout the several views, the preferred embodiment of the improved computer mouse of the present invention, generally 20 in FIG. 3 comprises a housing comprising a flat base 1, a vertical rear wall 5 at a right angle to base 1, and a top and front surface 3, disposed between the front edge of base 1 and the upper edge of rear wall 5. The top and front surface in the preferred embodiment shown in FIG. 3 is convex in shape. Referring again to FIG. 3, the front to rear dimension, A of the base, is less than the height, B of rear wall 5, so that the computer mouse is readily tiltable rearwardly. Height B of rear wall 5, in the preferred embodiment is a minimum of two inches. As shown in FIG. 7, switch 11, disables the mouse 20 when the front edge of base 1, is lifted from the work surface.

Referring again to FIG. 3 switches 7 are shown near the lower edge of top and front surface 3 for controlling the computer are operable with the fingers of the user in an extended position.

Figure 4:
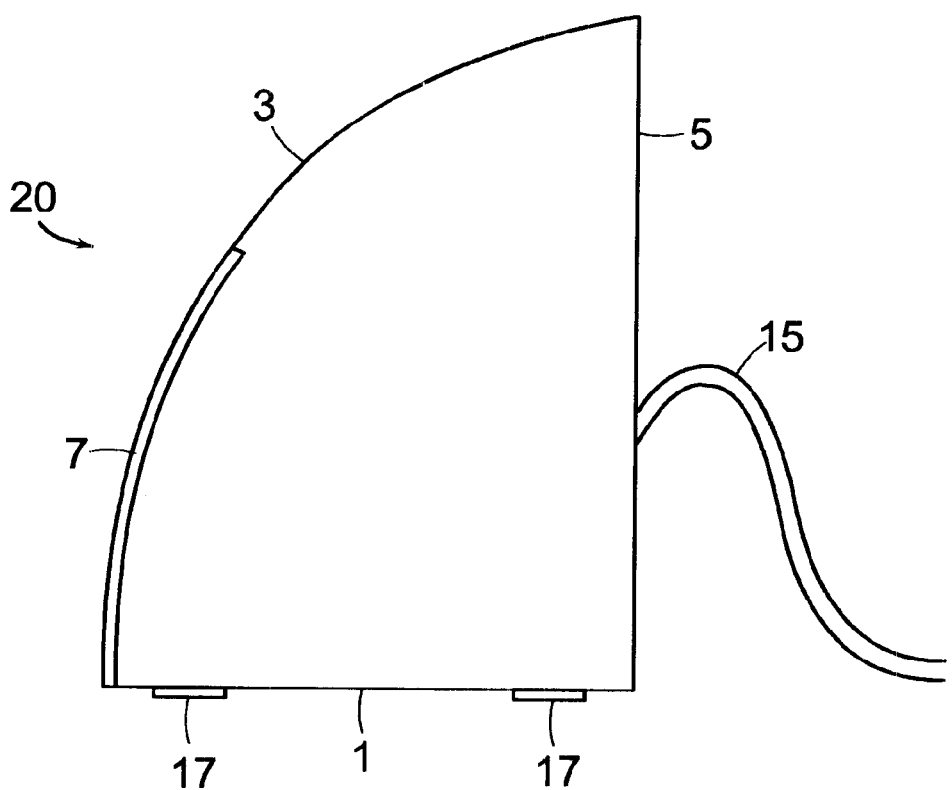
FIG. 4 is a side view of the preferred embodiment of the computer mouse of the present invention.

FIG. 4 is a side view of the preferred embodiment of the present invention and shows control wire 15 extending from the rear wall 5 of the computer mouse 20 above the work surface such that control wire 15 does not inhibit the rearward tiltability of the computer mouse 20. Also shown in FIG. 4 are feet 17 which extend below the flat base 1 to facilitate the tracking means of the computer mouse.

Figure 5:
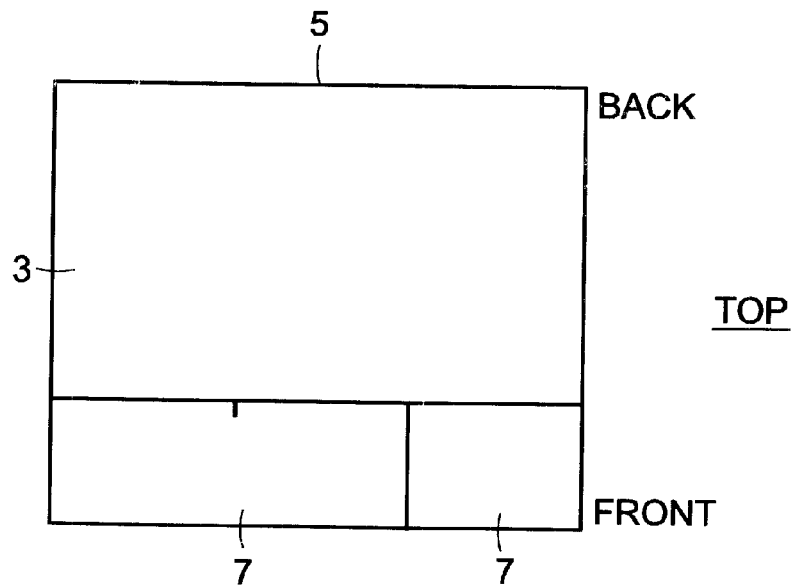
FIG. 5 is a top view of one embodiment of the computer mouse of the present invention.

FIG. 5 is a top view of an embodiment of the computer mouse 20 of the present invention wherein the top and front surface comprises only two switches 7 to control the computer.

Figure 6:
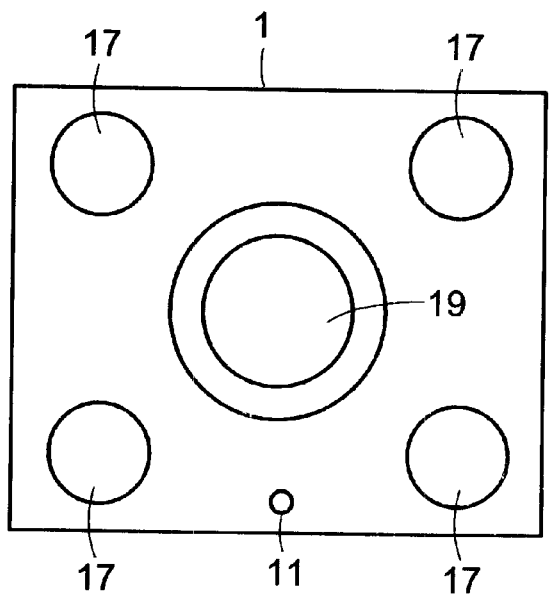
FIG. 6 is a bottom view of the preferred embodiment of the computer mouse of the present invention.

FIG. 6 is a bottom view of the flat base 1 of the preferred embodiment of the present invention computer mouse. FIG. 6 shows tracking means 19 in the center of flat base 1. Feet 17 are shown, one each, near the corners of the bottom side of flat base 1.

It will be readily apparent to those skilled in the art that many modifications to the preferred embodiment of the present invention are possible without deviating from the scope and spirit of the present invention. For instance it will be readily understood by those skilled in the art upon reading and understanding this specification and drawings that the present invention can be used with any computer or other device wherein a cursor control unit is required. Also understood is that the computer mouse of the present invention is designed to prevent the user from injuries caused by the prolonged or repetitive use of a computer mouse and that the present invention computer mouse can be adapted for use with any type of tracking means, switches, sensors, and disabling means available now or in future technology for computer mouse control devices. Thus, while the present invention has been described with preferred embodiments thereof, it will be understood that many modifications will be readily apparent to those skilled in the art. Therefore, it is intended that this invention be limited only by the following claims and equivalents thereto.

What is claimed is:

1. An improvement in a computer mouse for inputting cursor commands into a computer of the type having a flat base with a tracking means for use on a flat work surface and switches operable with the fingers of the user, said improvement comprising:
    a housing comprising a flat base,
        a vertical rear wall at a right angle to said flat base,
        a top and front surface disposed between the front edge of said base and the upper edge of said rear wall,
        said base having a front to rear dimension less than the height of said rear wall, so that the mouse is readily tiltable rearwardly,
        means for disabling the mouse when so tilted,
        said top and front surface being so disposed and elevated such that the user's hand is positioned above the work surface: (i) so that his/her fingers drape over the mouse touching the work surface or slightly thereabove, and (ii) so that the user's wrist is straight or substantially straight whereby repetitive or prolonged use of the mouse will lessen the likelihood of developing carpal tunnel syndrome or a related condition.

2. The improved computer mouse as claimed in claim 1 wherein said top and front surface is convex.

3. The improved computer mouse as claimed in claim 1 wherein said top and front surface is angular.

4. The improved computer mouse as claimed in claim 1 wherein said top and front surface is dimensioned to accept only two of the metacarpalphalangeal joints and extended fingers of the user.

5. The improved computer mouse as claimed in claim 1 wherein said top and front surface is dimensioned to accept only three of the metacarpalphalangeal joints and extended fingers of the user.

6. The improved computer mouse as claimed in claim 1 wherein said top and front surface has a minimum height of about two inches.

7. The improved computer mouse as claimed in claim 1 wherein said rear wall has a minimum height of about two inches.

8. The improved computer mouse as claimed in claim 1 wherein said rear wall has a height dimension less than two inches for use by persons with small hands.

9. The improved computer mouse as claimed in claim 1 wherein said disabling means is a switch.

10. The improved computer mouse as claimed in claim 1 wherein said disabling means is a sensor.

11. The improved computer mouse as claimed in claim 8 wherein said mouse comprises a signal device to warn user that said mouse is disabled.

12. The improved computer mouse as claimed in claim 9 wherein said mouse comprises a signal device to warn user that said mouse is disabled.

13. The improved computer mouse as claimed in claim 1 wherein the flat base of said mouse comprises feet to facilitate said tracking means.

14. The improved computer mouse as claimed in claim 1 wherein said mouse is wireless.

\* \* \* \* \*